United States Patent [19]
Drilling et al.

[11] 3,908,225
[45] Sept. 30, 1975

[54] UTILITY HANDLE

[75] Inventors: Joseph C. Drilling; Lary D. Jones, both of Lexington, Ky.

[73] Assignee: Square D Company, Park Ridge, Ill.

[22] Filed: May 13, 1974

[21] Appl. No.: 469,155

[52] U.S. Cl. .................................................. 16/124
[51] Int. Cl.[2] ......................................... A47B 95/02
[58] Field of Search ...... 16/110, 124, 125, DIG. 12, 16/DIG. 18, DIG. 19; 220/94

[56] References Cited
UNITED STATES PATENTS

| | | | |
|---|---|---|---|
| 2,142,953 | 1/1939 | Raymond .............................. | 16/125 |
| 2,612,308 | 9/1952 | Potts .................................... | 16/125 X |
| 2,941,235 | 6/1960 | Schwartz et al. ................... | 16/124 X |
| 3,621,510 | 11/1971 | Rollins ................................. | 16/125 |

*Primary Examiner*—George H. Krizmanich
*Attorney, Agent, or Firm*—Harold J. Rathbun; Ernest S. Kettelson

[57] ABSTRACT

A unitary integrally formed utility handle for rigid attachment to a panel or wall having a receiving slot, a first bearing region on one side of the slot on the rear of the panel and a second bearing region on the opposite side of the slot on the front of the panel, the utility handle having a hand grasp with an integrally formed tongue projecting therefrom to seat in said slot, a flange extending laterally from the free end of the tongue in a direction to bear against said first bearing region on the rear of the panel when the tongue is seated in the slot, a shoulder spaced inwardly from said flange and extending laterally from said tongue in the opposite direction to bear against said second bearing region on the front of the panel when the tongue is seated in the slot, a deformable rib integrally formed with said tongue spaced inwardly from said flange and projecting oppositely from said shoulder to face an open portion of the slot adjacent the tongue for staking therein to wedge and rigidly hold the tongue in the slot, as well as the flange against the first bearing surface on the rear of the panel, and the shoulder against the second bearing surface on the front of the panel, thus providing a rigidly affixed handle for such panel.

8 Claims, 3 Drawing Figures

UTILITY HANDLE

BACKGROUND OF THE INVENTION

Prior utility handles for rigid attachment to a panel, or to the wall of a device such as a container, have required separate securing means and parts such as mounting screws for removable attachment or a weld for permanent attachment, by way of examples.

The invention herein is an improvement over the prior art by providing a unitary integrally formed utility handle for rigid attachment to panels or walls of various devices which does not require separate securing means. The handle in accordance with this invention incorporates its own securing means as an integral part thereof. It provides a tongue projecting from a hand grasp to extend through a receiving slot of the panel or wall, whereupon integrally formed bearing means engage opposite sides of the panel or wall, and an integrally formed rib facing that portion of the receiving slot not occupied by the tongue is deformable for wedging therein to rigidly hold the handle in place on the panel or wall.

SUMMARY OF THE INVENTION

It is an object of this invention to provide a unitary integrally formed utility handle for rigid attachment to a panel or wall structure including a tongue integrally formed with and projecting from hand grasp means to seat within a receiving slot in said panel or wall structure, abutment means integrally formed and extending from opposite sides of said tongue to bear against opposite sides of said panel or wall structure, and integrally formed wedge means deformable for staking in said slot adjacent said tongue to rigidly seat therein and thus rigidly affix said handle to said panel or wall structure.

It is an object of this invention to provide a unitary integrally formed utility handle for rigid attachment to a panel or wall structure which may be made easily, economically and rapidly by the extrusion process.

It is an object of this invention to provide a unitary integrally formed utility handle for rigid attachment to a panel or wall structure without requiring separate securing means and parts.

It is an object of this invention to provide a unitary integrally formed utility handle which can be easily and quickly attached rigidly to a panel or wall structure by means of a staking tool without other tools, apparatus, accessories or parts It is an object of this invention to provide a unitary integrally formed utility handle for rigid attachment to a panel or wall structure which is of durable construction with uniform distribution of stresses to eliminate possibility of pre-mature failure of any single portion thereof.

It is an object of this invention to provide a unitary integrally formed utility handle for rigid attachment to a panel or wall structure which includes a tongue portion for seating engagement through a panel or wall structure of any thickness in cross section and abutment means at each end of said tongue portion to bear against opposite sides of the wall structure.

DETAILED DESCRIPTION OF PREFERRED EMBODIMENT

Figure 1:
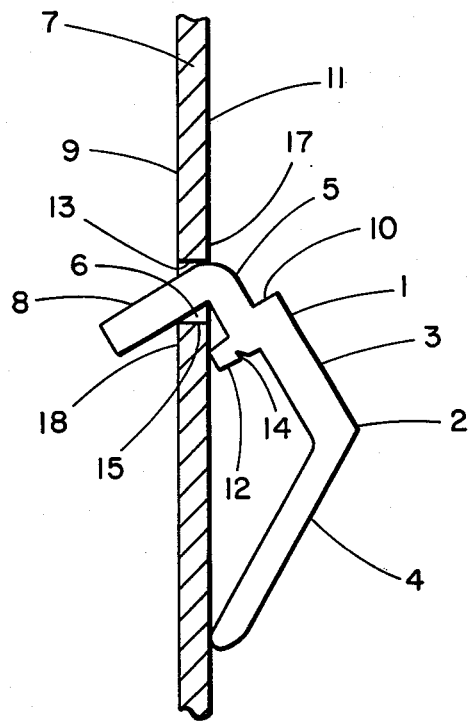
FIG. 1 is a side elevation view of a handle in accordance with this invention shown in relation to a panel shown in section to illustrate the receiving slot.
Figure 2:
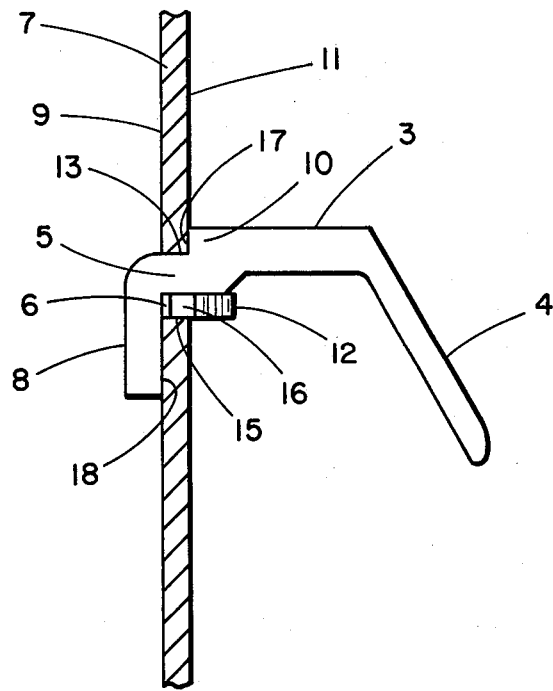
FIG. 2 is an elevation view of the handle and panel in FIG. 1 after the handle has been seated and the deformable rib has been staked within the slot of the panel.
Figure 3:
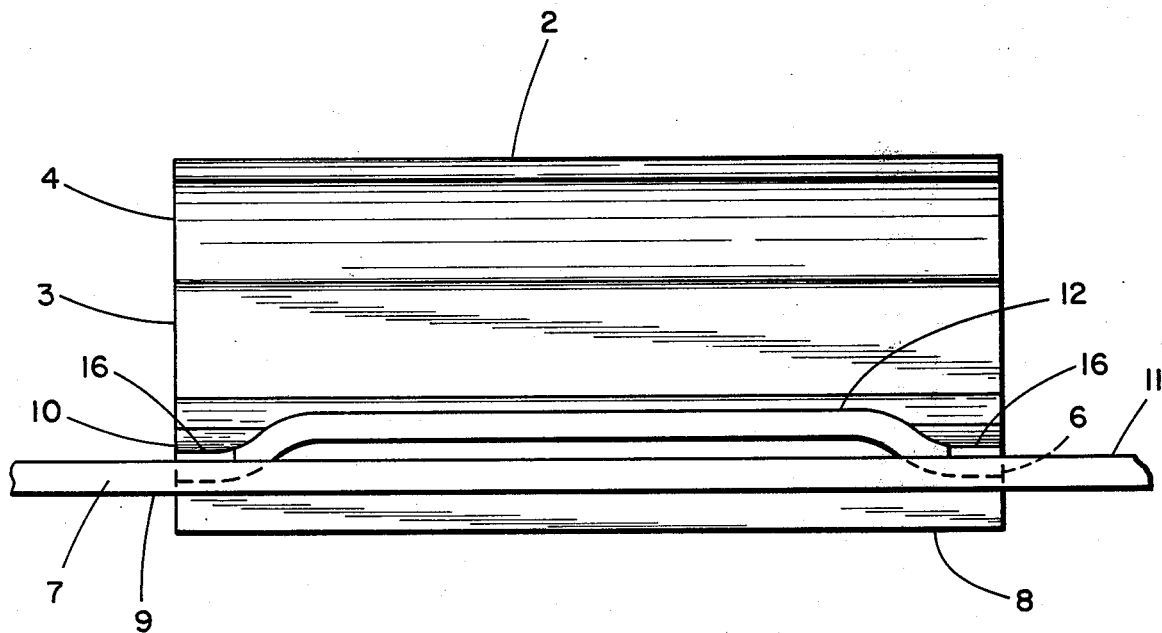
FIG. 3 is an elevation view of a handle and panel looking upward in FIG. 2.

A unitary handle 1 in accordance with a preferred embodiment of this invention includes a hand grasp 2 comprising a lateral span 3 and a depending segment 4. Integrally projecting rearward from the lateral span 3 is a tongue 5 which extends through and seats in slot 6 of panel 7. Integral bearing means are provided, including a flange 8 depending from the projecting end of tongue 5, and extending downward from tongue 5 and slot 6 as shown in FIG. 1 to bear against the rear surface 9 of panel 7. The said bearing means also includes a shoulder 10 extending in a direction opposite to that of flange 8 from an inner portion of tongue 5 at a point spaced from flange 8 slightly more than the cross-section width of panel 7. Shoulder 10 extends upward from tongue 5 and slot 6 as shown in FIG. 1 to bear against the front surface 11 of panel 7. As shown in the drawings, flange 8 and shoulder 10 extend perpendicular to tongue 5 in opposite directions and spaced apart to form an opposed L configuration having a common short leg.

A deformable rib 12 is formed integrally with tongue 5 and projects downwardly as shown in FIG. 1 for staking alignment with slot 6 below tongue 5 when said tongue has been seated therein abutting upper edge 13 of the slot 6. Rib 12 is spaced apart inwardly from flange 8 slightly more than the cross section width of panel 7 to permit deformation and staking of portions of rib 12 within slot 6 of panel 7.

A scoring groove 14 may be provided along the outer junction between tongue 5 and rib 12 to weaken the integral connection along groove 14 and thus facilitate deformation of portions of rib 12 for staking within slot 6.

The length of the projection of rib 12 from tongue 5, plus the cross section width of tongue 5, is substantially equivalent to the measurement between upper edge 13 and lower edge 15 of slot 6. Thus, when end portions 16 of rib 12 are deformed and staked within slot 6 adjacent the portion of tongue 5 within said slot, they provide a tight rigid fit. Tongue 5 is thereby captively secured in place and held tightly against upper edge 13 of slot 6 while deformed rib 12 bears tightly and wedgingly against lower edge 15 of slot 6. Shoulder 10 is thus held securely in abutting relationship against first bearing region 17 on the front surface 11 of panel 7, above slot 6 shown in FIG. 1. Flange 8 is likewise held securely in abutting relationship against second bearing region 18 on the rear surface 9 of panel 7, below slot 6 as shown in FIG. 1.

When hand grasp 2 is urged upwardly, in the view of FIG. 1, the attachment means provided by the handle in accordance with this invention is adapted to increasingly secure the handle 1 to the panel 7 or wall structure of the device on which it is used. The greater the upward thrust on hand grasp 2, the greater the bearing thrust of shoulder 10 against bearing region 17 on the first surface 11 above slot 6, and of flange 8 against bearing region 18 on the rear surface 9 below slot 6.

Likewise, when hand grasp 2 is urged downwardly, in the view of FIG. 1, increasing the thrust in such direction increases the thrust of tongue 5 and staked end portions 16 of rib 12 against lower edge 15 of slot 6, to increasingly strengthen and tighten the attachment of handle 1 to panel 7 as downward thrust is increased on hand grasp 2.

The hand grasp 2, including lateral span 3 and depending segment 4, shoulder 10, tongue 5, flange 8, and rib 12 may be the same width, their respective opposite side edges lying in the same respective opposite planes. The axes of said parts may be parallel and their respective surface planes may extend from one opposite side to the other parallel to said axes, thus providing a utility handle with integrally formed attachment means which may be made rapidly and economically by the extrusion process, using an extrudable material such as aluminum by way of example. The handles according to this invention may be made of other materials and by other processes.

A handle as described herein-above is secured to a panel or wall structure of a device in the following manner. A slot 6 of desired length and width is formed in the panel or wall structure, and a handle 1 of substantially equivalent width is selected which also has flange 8 spaced from shoulder 10 a distance substantially equivalent to the cross section width of the panel, and whose tongue 5 has a cross section width which when combined with the projecting length of rib 12 is substantially equivalent to the distance between upper and lower edges 13 and 15 of the slot 6.

Flange 8 is inserted through the slot 6 and rotated to abut bearing region 18 on rear surface 9. Tongue 5 is held in abutment against upper edge 13 of the slot 6, shoulder 10 then abutting bearing region 17 on the front surface 11 of the panel 7 or wall structure. End portions 16 of rib 12, from each edge thereof, are then deformed in a direction toward slot 16 by means of a punch or other appropriate tool to stake such end portions 16 of rib 12 within slot 6 in wedging relation between tongue 5 and lower edge 15 of the slot.

In accordance with this invention, the thrust forces and stresses are distributed uniformly by providing a thrust bearing flange 8 and shoulder 10 which may extend unbroken for the same entire distance between opposite sides as the widest portion of the handle. Similarly the load bearing tongue 5 may extend unbroken for the same entire distance, as may the hand grasp 2. Accordingly, no individual segment of these members bears a disproportionate part of the stresses associated with the functions performed by utility handles, and consequently no part fails prematurely while the rest of the handle is still functional, as sometimes happens with handles attached by other means such as spaced apart screws or one or more welds where stresses may be concentrated.

Handles in accordance with this invention may be used with a wide variety of devices such as containers, doors, covers and the like. A specific example by way of illustration is a metal cover plate such as may be used to close the access opening of an enclosure for electric meters or the like.

The dimensions of tongue 5, flange 8, shoulder 10, and rib 12 may be varied to accomodate panels and wall structures of any thickness, shape, size and material in which receiving slots may be formed of any appropriate dimension.

Various modifications may be made in the structure described herein and shown in the accompanying drawings without departing from the spirit of the invention and scope of the attached claims.

We claim:

1. A unitary handle for rigid attachment to a wall structure, comprising hand grasp means, a tongue portion joined to and projecting from said hand grasp means for attaching engagement in a receiving slot through said wall structure, said tongue portion being an integral web having lateral and longitudinal dimensions substantially corresponding to the lateral and longitudinal dimensions of said slot through which said tongue portion is received, a flange integrally joined to said tongue portion and depending therefrom in a first direction parallel to a rear surface portion of said wall structure and abutting there-against when said tongue portion is seated for attachment in said slot, a shoulder integrally joined to said tongue portion and extending therefrom in an opposite second direction at a point spaced apart from said flange and parallel to a front surface portion of said wall structure to abut there-against when said tongue portion is seated for attachment in said slot, and wedge means associated with said tongue portion to securely wedge and rigidly hold said tongue portion in said slot.

2. A unitary handle for rigid attachment to a wall structure, comprising hand grasp means, seating means projecting therefrom for attaching engagement in a receiving slot through said wall structure, first abutment means associated with said seating means and positioned to bear against a rear surface portion of said wall structure when said seating means is seated in said slot, second abutment means associated with said seating means and positioned to bear against a front surface portion of said wall structure when said seating means is seated in said slot, wedge means associated with said seating means to securely wedge and rigidly hold said seating means in said slot, said wedge means including a deformable member integrally joined to and projecting from said seating means at a point outward of and adjacent the plane of the front surface of said wall, said deformable member being aligned with said receiving slot for staking therein when said seating means is seated for attachment in said slot to wedge said seating means for rigid attachment of said handle to said wall structure.

3. A unitary handle for rigid attachment to a wall structure, comprising hand grasp means, a tongue portion joined to and projecting from said hand grasp means for attaching engagement in a receiving slot through said wall structure, the width of said tongue portion in cross section being less than the corresponding width of said slot by a predetermined dimension, first abutment means associated with said tongue portion and positioned to bear against a rear surface portion of said wall structure when said seating means is seated in said slot, second abutment means associated with said tongue portion and positioned to bear against a front surface portion of said wall structure when said tongue portion is seated in said slot, wedge means associated with said tongue portion to securely wedge and rigidly hold said tongue portion in said slot, said wedge means including a rib member integrally joined to and projecting from said tongue portion at a point outward of and adjacent the plane of the front surface of said wall, the projecting length of said rib being substantially equal to said predetermined dimension, said predetermined dimension being equal to the width of said receiving slot less the width of said tongue portion in cross section, at least a portion of said rib being deformable and aligned with said receiving slot for staking of said deformable portion therein when said tongue portion is seated for attachment in said slot, to wedge said tongue portion for rigid attachment of said handle to said wall structure.

4. A unitary handle as set forth in claim 3, wherein said first abutment means comprises a flange integrally joined to said tongue portion and depending therefrom in a first direction parallel to a rear surface portion of said wall structure and abutting there-against when said tongue portion is seated for attachment in said receiving slot, and wherein said rib member projects from said tongue in the same first direction as said flange.

5. A unitary handle as set forth in claim 4, wherein said second abutment means comprises a shoulder integrally joined to said tongue portion and extending therefrom in a second direction oppositely from said first direction and from a point spaced apart from said flange, said second direction being parallel to a front surface portion of said wall structure and said shoulder abutting against said front surface portion when said tongue portion is seated for attachment in said slot.

6. A unitary handle as set forth in claim 5, wherein said hand grasp means comprises a lateral portion integrally joined to said tongue portion and a depending portion integrally joined to said lateral portion, wherein all the members including said lateral portion, said depending portion, said shoulder, said tongue portion, said rib member and said flange are of equal width, the respective opposite sides of said members lie in the same opposite and parallel planes, the axes of said members from one opposite side to the other are parallel, and the surface planes of each of said members extend from one opposite side to the other parallel to said axes.

7. A unitary handle as set forth in claim 6, wherein said hand grasp means, said shoulder, said tongue portion, said flange are of uniform, solid cross section from one of said opposite sides to the other, and are formed in such configuration to cooperatively and uniformly engage respective portions of said wall structure to which said handle is rigidly affixed throughout the entire extent of their engagement from one opposite side to the other, to thereby distribute stresses uniformly throughout said members.

8. A unitary handle as set forth in claim 6, including said wall structure rigidly attached thereto, and wherein said wall structure is a cover plate to close the access opening of an enclosure.

* * * * *